Oct. 5, 1954   J. KIECHLE   2,690,681
MULTIRATIO CHANGE SPEED GEAR
Filed Oct. 31, 1951

Inventor:
Julius Kiechle
by Edmund H. Parry Jr.
Attorney

Patented Oct. 5, 1954

2,690,681

UNITED STATES PATENT OFFICE 2,690,681

MULTIRATIO CHANGE SPEED GEAR

Julius Kiechle, Friedrichshafen, Bodensee, Germany, assignor to Zahnradfabrik Friedrichshafen, Aktiengesellschaft, Friedrichshafen, Bodensee, Germany Application October 31, 1951, Serial No. 254,045

Claims priority, application Germany November 11, 1950

4 Claims. (Cl. 74—368)

My invention relates to improvements in a multi-ratio change speed gear for power-driven vehicles with constantly meshing gear-wheels and engageable and disengageable clutches associated therewith together with a torque-transmitting free-wheel overrunning-device incorporated with one element of a lower gear train and whereby engagement and disengagement of the clutches will be performed by means of a clutch operating bar, common to all clutches. The invention aims at attaining in change speed gears of said kind an especially simple construction of the entire gear box and of the gear shifting means.

Such advantages are secured by constructional features as follows: The shifting sleeve of the clutch for the lowest speed is attached to a sliding-gear which belongs to the reverse gear train. The said shifting sleeve and the clutch actuating bar are joined together by a locking element. In case of shifting the speeds upwardly after operative connection of a lower transmission speed, without re-connection of the same, the higher speeds may be brought successively into operative engagement. After having shifted the speeds downwardly, when the said lower gear train has been declutched and the clutch actuating bar is moved further on, the reverse gear train comes into operation. This construction has the advantage that thhe shifting members which belong to the clutch of said lower gear train, are of extraordinarily small size so that in turn the total length of the entire gear box will be diminished. The shifting members are relatively simple elements, being strong enough to withstand all demands. Besides the particular pieces may be produced at low prices. The construction of the arrangement is characterized by a rigid connection between the shifting sleeve of the lowest gear train and a collar resting on the clutch actuating bar, whereby said collar may be locked to the bar by means of a releasable element when it is intended to get the reverse gear train into operation. The releasable locking element which fixes the collar onto the clutch actuating bar is also adapted to secure the shifting sleeve of the clutch of the lowest gear train in its operative position.

Further characteristics of the invention will appear from the following description.

The accompanying drawings show embodiments of the invention by way of example.

Figure 1:
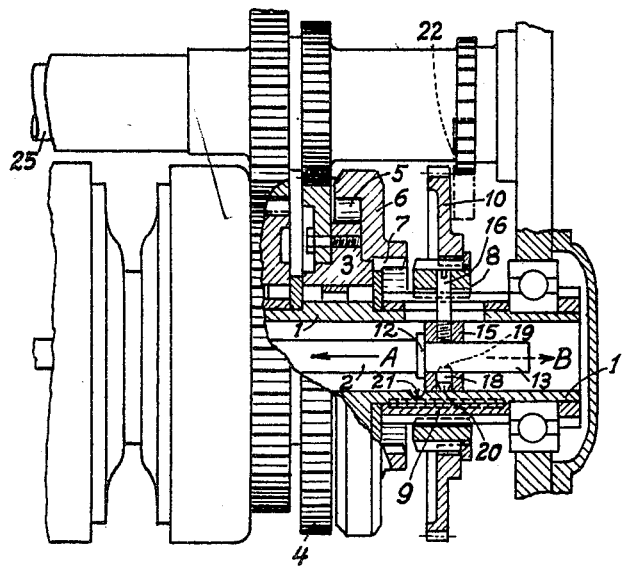
Fig. 1 is a sectional view of a change speed gear in which a clutch actuating bar is used for the gear shifting operations. The parts are shown in the position in which neither the clutch of the lowest gear train is operative nor the reverse gear train is in use.

The clutches and gear wheels of the gear trains are mounted on a hollow gear shaft 1 in which the clutch operating bar 2 is guided for axial movement. The bar has a number of cam-like projections (not shown) by which with axial displacement of the bar the higher gear train clutches (not shown) may be brought into operation while the low gear train clutch is engaged. For the clutch of the lowest gear train, provided with a free wheel device, the shifting arrangement differs from the shifting arrangements of the other clutches. Shaft 1 carries loosely turnable the inner part 3 of the free wheel device. This part is fixed to the toothed wheel of the lowest gear train and carries the clamping elements 5 which are embraced by the annular outer part 6. The latter terminates in a hub with inner coupling claws 7 and oppositely thereto corresponding claws are provided on shifting sleeve 8 which is axially displaceable on a guiding sleeve 9. The latter is fixed to hollow shaft 1. The shifting sleeve supports by means of a key the sliding gear 10 of the reverse gear train. The bar 2 terminates in a collar 12 and an extension 13, which latter carries an axially displaceable tubular member or bush 15, the outer peripheral surface of which may be guided sliding contact with the hollow shaft 1. The bush 15 and the shifting sleeve 8 are rigidly secured together by means of one or more dogbolts 16 so that both elements may axially be displaced as a unit along shaft 1. The wall of the hollow shaft is provided with a slot or several slots allowing for displacement of bolt 16 or several bolts, thereof. Bush 15 supports a locking bolt 18 extending in a direction radial to the axis of extension 13 of the bar 2. The ends of the bolt are of conical shape as may be seen from the drawings. The end part 19 of the bolt 18 is adapted to fit into a corresponding recess of the extension 13, while the end 20 of bolt 18 may fit into a recess 21 of hollow shaft 1. Both the said recesses are shaped exactly in conformity with the ends of bolt 18.

Figure 2:
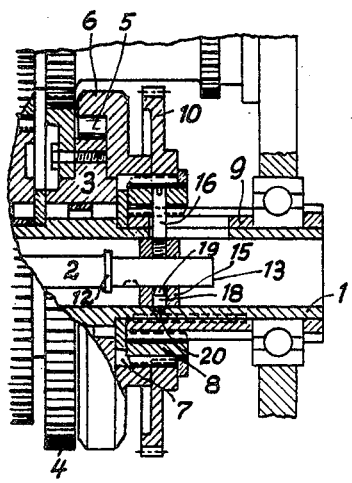
Fig. 2 shows the position in which the clutch of the lowest gear train and the clutch of a further gear train are in use.
Figure 3:
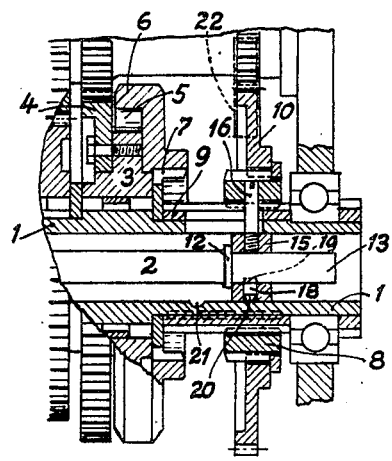
Fig. 3 shows the position in which only the reverse gear train is operative.

The mechanism operates in the following manner:

If the driver desires to use the speeds in the upward range it is necessary to move the clutch actuating bar 2 from the idling position shown in Fig. 1 in the direction of arrow A. At first the clutch of the lowest gear train will come into engagement by pushing bush 15 by means of the bolt 18 and thus shifting sleeve 8 gets into mesh with the coupling claws 7 of the free wheel mechanism 3, 5, 6. After this has happened, bolt 18 was pushed outwardly into the recess 21 of hollow shaft 1, so that shifting sleeve 8 is locked in the position shown in Fig. 2. Bar 2 is now free for further movement in the direction of arrow A, allowing shifting of the higher gear trains one after the other.

If with axial movement of bar 2 in the direction of arrow B the gear clutches are disengaged, one after the other, and with further movement of bar 2 its collar 12 comes in contact with bush 15 so that shifting sleeve 8 of the lowest gear train will now be released from the coupling claws 7 and in the meantime the locking bolt 18 is pushed backwards from recess 21 towards bar part 13 whereby bush 15 is fixed again thereon. If it is desired to engage the reverse gear train bar 1 must be moved further on in the direction of arrow B so that reverse gear wheel 19 will come into mesh with the third gear wheel 22 and consequently the reverse drive of shaft 25 is obtained.

I do not want to be limited to the details described or shown in the drawings as many variations will occur to those skilled in the art.

What I claim is:

1. A change speed gear comprising a drive shaft, a driven shaft, one of said shafts being hollow, pairs of constantly meshing low and high gears on said shafts, the gears of said pairs on the hollow one of said shafts being free thereon and adapted to selective rotary driving connection therewith, an over-running clutch on said hollow shaft in connection with the low gear on said hollow shaft, a shift sleeve splined to said hollow shaft for axial shifting movement in opposite directions, coacting clutch parts on said sleeve and said overrunning clutch engageable by shifting movement of said clutch sleeve in one axial direction to establish driving connection between the over-running clutch and said hollow shaft, a reverse gear train for reversely driving the driven shaft from the drive shaft, said reverse gear train including an axially shiftable gear secured to said shifting sleeve on said hollow shaft and being shiftable into mesh with a coacting gear of the reverse gear train upon shifting movement of the shifting sleeve in the second axial direction, a shifting bar located in said hollow shaft for axial movement in opposite directions therein, a tubular member slidably mounted on the shifting bar and rigidly connected with said shifting sleeve, releasable locking means adapted to secure the tubular member to the shifting bar for movement therewith in said second axial direction for shifting by the shifting bar of said shiftable reverse gear into mesh with said coacting gear of the reverse gear train and for return movement therewith in the said first direction for shifting by the shifting bar into clutching engagement of said coacting clutch parts of the shifting sleeve and the over-running clutch, and further releasable locking means adapted to secure said tubular member to said hollow shaft for further movement of the shifting bar in said first direction independently of the tubular member and the shifting sleeve when said coacting clutch parts of the shifting sleeve and the over-running clutch are engaged.

2. In a multi-ratio change speed gear for power driven vehicles with alined pairs of constantly meshing high and low gear wheels the combination of: a hollow gear shaft supporting one line of said gear wheels, a torque-transmitting freewheel device including elements of the low gear pair, the inner part of the free-wheel device being fixed to the low gear wheel on the hollow shaft, while the outer annular part is provided with a clutch half having coupling claws, a shifting sleeve having coupling claws corresponding to said clutch half, a gear-wheel belonging to the reverse gear train fixed on said shifting sleeve, a clutch actuating bar guided for axial movement within said hollow gear shaft, said bar terminating in a collar and an extension, said extension supporting a tubular member rigid with said shifting sleeve, a locking element movably mounted in a transverse bore in the wall of the tubular member and adapted to be moved into releasable securing engagement with a recess in said clutch actuating bar for securing said tubular member and said shifting sleeve together on said bar during movement of said bar in the sense of shifting the speeds in the downward range.

3. A multi-ratio change speed gear as claimed in claim 2, wherein means is provided for securing the tubular member on the clutch actuating bar including said releasable locking element, said releasable locking element having a tapered end, and the clutch actuating bar having a correspondingly shaped recess adapted to receive said tapered end of the securing element.

4. A multi-ratio change speed gear as claimed in claim 2 wherein means is provided for securing said tubular member on said clutch actuating bar including said releasable locking element, said element comprising a bolt with tapered opposite ends, adapted to be moved in one direction into a correspondingly tapered recess of said clutch actuating bar for securing said tubular member on said clutch actuating bar, and in opposite direction into a tapered recess in said hollow shaft, in the latter position said shifting sleeve being secured when in mesh with said coupling half of said free-wheel device of the low gear train.

References Cited in the file of this patent
UNITED STATES PATENTS

| Number | Name | Date |
|---|---|---|
| 1,451,722 | Valentine | Apr. 17, 1923 |
| 2,501,281 | Longstreet | Mar. 21, 1950 |
| 2,526,919 | Wilson | Oct. 24, 1950 |
| 2,592,982 | Violet | Apr. 15, 1952 |